Feb. 8, 1955  DU BOIS EASTMAN ET AL  2,701,756
MANUFACTURE OF SYNTHESIS GAS
Filed Dec. 20, 1951  2 Sheets-Sheet 1

INVENTORS
duBOIS EASTMAN
LEON P. GAUCHER
BY
ATTORNEYS

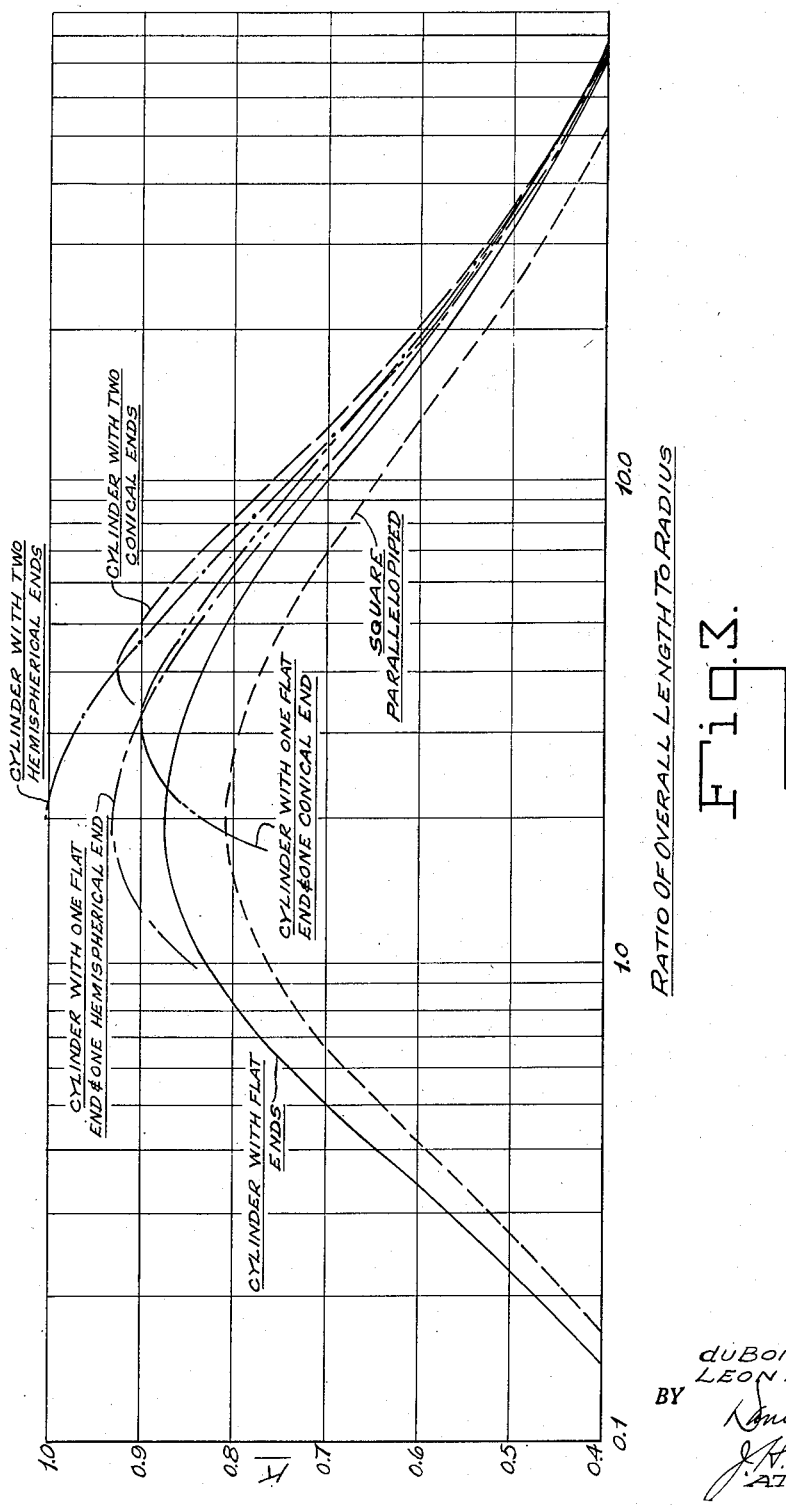

… …

United States Patent Office 2,701,756
Patented Feb. 8, 1955

2,701,756

MANUFACTURE OF SYNTHESIS GAS

Du Bois Eastman, Whittier, Calif., and Leon P. Gaucher, Tuckahoe, N. Y., assignors to The Texas Company, New York, N. Y., a corporation of Delaware Application December 20, 1951, Serial No. 262,610

12 Claims. (Cl. 48—196)

This invention relates to a process for the manufacture of gas containing carbon monoxide and hydrogen suitable for charging to a synthesis reaction zone for the production of hydrocarbons, oxygen-containing compounds and the like.

The invention comprises a process for effecting conversion of carbonaceous material and particularly hydrocarbons or other compounds containing carbon and hydrogen into carbon monoxide and hydrogen by reaction with oxygen at relatively high temperature substantially without carbon formation and also with relatively small formation of carbon dioxide and water. The process of this invention is particularly applicable to the generation of synthesis feed gas for the synthesis of hydrocarbons, and for the generation of hydrogen for the synthesis of ammonia. The present process is generally useful for the production of carbon monoxide, hydrogen or mixtures of carbon monoxide and hydrogen and, therefore, finds a number of applications in chemical manufacture.

This application is a continuation-in-part of the application of Du Bois Eastman and Leon P. Gaucher, Serial No. 191,446, filed October 21, 1950, and issued as U. S. Patent No. 2,582,938 on January 15, 1952, which in turn is a continuation-in-part of the application of Du Bois Eastman and Leon P. Gaucher, Serial No. 717,267, filed December 19, 1946, and now abandoned.

The partial combustion of methane with oxygen to produce carbon monoxide and hydrogen has long been recognized. According to the theoretical reaction:

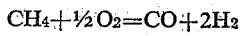

$$CH_4 + \tfrac{1}{2} O_2 = CO + 2H_2$$

half a mol of oxygen is required per mol of methane and synthesis gas containing a 2 to 1 ratio of hydrogen to carbon monoxide is produced. This ideal is never achieved due to the complexity of the reaction mechanism (the theoretical reaction representing only the summation of many reactions) and the fact that a number of competing reactions exist. Prettre, Eichner and Perrin, Transactions of the Faraday Society, 42, 335–339 (March-April 1946) investigated this reaction and concluded that approximately one-quarter of the methane is completely oxidized to carbon dioxide and water vapor and that the remaining three-quarters of the methane reacts with these products to produce carbon monoxide and hydrogen. The same conclusions were reached by Patry and Dol, Chaleur et Industrie, 31, 115–119 (May 1950).

A number of investigators have studied the reaction between methane and oxygen to produce carbon monoxide and hydrogen. Both the catalyzed and uncatalyzed reaction have been investigated. These investigators obtained very poor results in the absence of catalysts. Prettre et al., above cited, found that the uncatalyzed reaction prevented appreciable reduction of the carbon dioxide and water vapor resulting from the combustion of methane and produced a product very different from the equilibrium product, containing appreciable quantities of carbon dioxide and water and contaminated with deposited carbon. These investigators found that methane could be rapidly and completely converted in the presence of a large contact surface. Hot surfaces are recognized catalysts for combustion reactions as is stated by Walker, Lewis, McAdams, and Gilliland, "Principles of Chemical Engineering," 173–176, third edition, McGraw-Hill Book Company, Inc., New York, 1937, and Haslam and Russell, "Fuels and Their Combustion," 150, McGraw-Hill Book Company, Inc., New York, 1926, Fisher and Pichler, Brennstoff-Chemie, 1930, 501–507, investigated both the catalyzed and uncatalyzed reaction and concluded that the reaction should be carried out in the presence of a large amount of contact surface if desired products are carbon monoxide and hydrogen. More recently, Patry and Dol, above cited, after an extensive investigation, concluded that the reaction space must be completely packed with solid particles in order to prevent the formation of carbon.

Similarly, prior patents disclose that a catalyst or packing is very important to the reaction. For example, British patent, 349,471, reviews the art and states that in the combustion of methane with half its volume of oxygen it is impossible to avoid the separation of carbon. In the process of this patent, coke is used as packing for the reaction zone and at least 33⅓ per cent oxygen in excess of the theoretical must be employed to avoid carbon formation.

We have investigated on a pilot plant and semi-commercial scale, both catalytically and non-catalytically, partial oxidation of carbonaceous fuels to carbon monoxide and hydrogen. Contrary to the prior art teachings, we found, surprisingly, that better results are obtained in a compact and unpacked reaction zone, than with various catalysts. We have found, for example, that it is possible to produce very high yields of carbon monoxide and hydrogen by partial oxidation of a gaseous hydrocarbon with substantially no formation of carbon and with near-theoretical oxygen consumption. We have also found that it is possible to produce high yields of carbon monoxide and hydrogen with a very low residual methane content.

Very important factors in the present invention are the physical aspects of the reaction zone. Not only must the reaction zone be free from catalyst and packing material, but also, contrary to prior art teachings, it should contain near-minimum internal surface area. Free transfer of radiant heat energy appears to be very important in the process of our invention. The reaction zone must be substantially completely closed to prevent loss of heat by radiation and provide radiation boundary surfaces substantially uniformly maintained at a temperature approaching the reaction temperature. The reaction zone must be compact and free from extended surface. A reaction zone having an internal surface area not greater than about 1.5 times the surface area of a sphere of equal volume is entirely satisfactory.

Theoretically, i. e., by thermodynamic calculations, at temperatures above 2,000° F. no carbon formation occurs when the ratio of atoms of oxygen to atoms of carbon (O/C) is above about 0.95, cf. Montgomery, Weinberger, and Hoffman, Ind. and Eng. Chem. 40, 601–7 (April 1948). As a practical matter, however, carbon forming conditions have been found to exist with O/C ratios of as much as 1.5 and higher. The problem of carbon formation is, in fact, a very serious problem which has hindered industrial development of this type process. For this reason, the less advantageous methane-steam reaction has found commercial favor. In the present process, however, it is possible to obtain freedom from carbon, or to operate with less than that amount which causes operating difficulties, at near-theoretical O/C ratios. In an unpacked reactor, the continuous production of approximately 30 pounds of free carbon per million cubic feet of feed gas may be tolerated without impairing the product or clogging the reaction chamber. Since this amount of hydrocarbon gas forms a much larger volume of final product gas, it is apparent that the resulting contamination is truly negligible. By the process of this invention, carbon production may be maintained well below this limit.

In accordance with this invention, a feed hydrocarbon, e. g., methane, and oxygen, or a gas containing at least 40 volume per cent free oxygen, are subjected to reaction with one another in a compact reaction zone free from packing and catalyst. Good results may be secured by preheating both reactants, by preheating only the hydrocarbon or by omitting preheating of both reactants. The reactants are then preferably separately passed to a reaction zone of a generator free from packing and catalyst and operating at a temperature in the range of about 2,000° F. and higher. The pressure may range from atmospheric to 500 pounds per square inch gauge or higher; for the generation of hydrocarbon synthesis feed gas, the pressure preferably is within the range of about 200 to 500 pounds per square inch gauge. The proportion of oxygen passed to the reaction zone relative to hydrocarbons is maintained such that the reaction of hydrocarbons to form carbon monoxide and hydrogen is supported without addition of heat to the reaction zone from external sources except that as sensible heat of the entering reactants, and such that free carbon is substantially completely absent from the product gas leaving the reaction zone.

In the accompanying drawings,

Figure 3 is a graph representing the relation of the surface ratios of generators of different shapes as compared to the surface of spheres of corresponding volumes.

Figure 1:
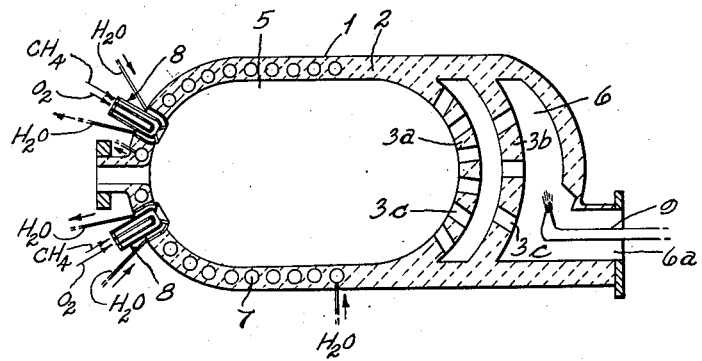
Figure 1 is a section taken along the horizontal axis of a gas generator, shown somewhat diagrammatically.

In one embodiment of this invention a hydrocarbon consisting essentially of methane is reacted with oxygen, in the absence of added steam and in the absence of a catalyst, at a temperature in the range of about 2,000 to 3,000° F. and under the aforesaid pressure range in a reaction zone in which the ratio of interior surface area to interior volume is relatively small as later explained. The hydrocarbon gas, separately preheated to at least 800° F., if preheated, and preferably to about 1,200° F., preferably with no cracking, is charged at a rate of about 1,000 to 3,000 cu. ft./hr./cu. ft. of reaction space. The oxygen is charged to the reaction zone in an amount such that combustion, or what can be termed a primary reaction, occurs with a substantially non-luminous flame within the reaction zone, except in the relatively small region adjacent the point of initial contact between entering gas and oxygen streams, this primary reaction being substantially exothermic. Some of the products of the primary reaction and excess hydrocarbon then enter into a secondary reaction or reactions which are substantially endothermic. The final products of reaction are continuously removed from the reaction zone as an effluent stream consisting essentially of carbon monoxide and hydrogen and containing approximately 5 mol per cent water or less and substantially less than 2 mol per cent of carbon dioxide basis water-free product. The effluent stream is substantially free from suspended carbon in that it contains less than 1 gram/1000 cu. ft. of product gas measured under standard conditions. This is equivalent to about 5 to 7 pounds of carbon per million cubic feet of hydrocarbon feed gas. The product gas is also substantially free from uncombined oxygen containing not more than about 0.10 mol per cent uncombined oxygen. The residual methane content of the product gas does not exceed 4 or 5 mol per cent. It contains carbon monoxide and hydrogen in the proportion of about 1 mol carbon monoxide to 2 mols of hydrogen. The molecular proportions depend, however, upon other factors, such as the composition of the feed hydrocarbons, and advantage may be taken of these factors in producing gas containing carbon monoxide and hydrogen in the desired proportions.

The process may be operated at temperatures ranging from about 2,000 to 3,000° F. or higher, the upper limit of temperature being determined by the inherent limitations of materials of construction. A temperature within the range of from about 2,200° F. to about 2,800° F. is preferred.

Space velocities may vary from about 100 to about 20,000 std. cu. ft./hr./cu. ft. of reactor volume, based on the product gas.

The temperature of the effluent stream leaving the reaction zone is preferably quickly reduced by quenching or cooling. It is desirable to reduce the temperature, for example, from about 2,600° F. to about 1,000 to 1,500° F. in not more than 1 second so as to avoid undesired side reactions, some of which lead to carbon formation at this stage.

For the generation of hydrocarbon synthesis feed gas, oxygen of relatively high purity, at least 80 per cent and preferably at least 95 per cent, is preferably used, thereby eliminating a large amount of nitrogen from the reactant feed to the gas generator. This materially reduces the heat requirements and also results in a synthesis gas more suitable for the hydrocarbon synthesis operation. In the generation of hydrogen for the synthesis of ammonia, oxygen-enriched air may be used as the source of oxygen. In this application of the present process, nitrogen is not objectionable in the product gas. Enriched air containing above about 40 volume per cent oxygen is suitable as the source of oxygen feed to the process.

The proportion of oxygen charged to the gas generator relative to the hydrocarbon feed is important from the standpoint of avoiding free carbon production and excessive carbon dioxide and water formation. Suitable conditions of operation are realized at the minimum of 2,000° F. by initially regulating the oxygen charged to the generator, or as it can be otherwise stated, the O/C ratio (atomic ratio of total oxygen to total carbon in the feed) within the limits of approximately 1.0 to 1.2, and adjusting the O/C ratio within these limits to obtain a substantially carbon-free product gas. This principle applies whether the O be from substantially pure oxygen, an oxygen-enriched gas or air and the C be from a solid hydrocarbon as coal, a liquid hydrocarbon as fuel oil, or a gaseous hydrocarbon as natural gas.

When a hydrocarbon gas is partially oxidized to carbon monoxide and hydrogen in accordance with the present process, by reaction in a compact, unpacked reaction zone and by adjusting the O/C ratio, it is possible to obtain substantially carbon-free operation, i. e., less than 30 pounds carbon per million cubic feet of feed gas, over a rather wide range of operating conditions. The residual methane in the product gas may be varied from substantially zero to 4 to 5 mol per cent and even as high as 7 mol per cent and the carbon production will not exceed 30 pounds per million cubic feet of feed gas.

When the carbon content of the effluent gas from the generator exceeds about 30 pounds per million cubic feet of feed gas, the presence of free carbon in the product gas is evidenced by noticeable discoloration of water used in quenching the effluent stream. There appears to be no discoloration of the quench water when the carbon in the product gas amounts to 30 pounds per million cubic feet of feed gas. This is about 0.1 weight per cent of the carbon in the feed.

An important feature of this invention is the ability to produce a product gas having a methane content of less than about 0.5 mol per cent and even as low as 0.05 mol per cent, particularly useful as a source of hydrogen for high pressure hydrogenation processes, e. g., ammonia synthesis. When methane is undesirable in the product gas, it is often desirable to reduce the methane content in the product gas below about 0.5 mol per cent methane to as low as 0.05 mol per cent or lower or, generally, within the range of from about 0.1 to about 0.4 mol per cent. By supplying sufficient free oxygen to the generator to maintain the temperature above about 2,250° F., and preferably above about 2,600° F., the methane content of the product gas may be substantially eliminated. This is particularly desirable in the generation of hydrogen for the synthesis of ammonia or for other chemical reactions.

In the generation of carbon monoxide and hydrogen for the synthesis of hydrocarbons, maximum conversion of carbon in the feed gas into product gas (carbon monoxide and hydrogen) is realized when the methane content of the generator effluent is in the neighborhood of about 0.3 per cent. Maximum conversion of oxygen to synthesis gas results in a somewhat higher methane content in the product gas. In any case, the maximum yield point will vary somewhat depending upon the heat losses from the reactor, operating conditions, etc.

Under the conditions of temperature and pressure contemplated and with a feed hydrocarbon consisting essentially of methane, for example, the total oxygen usually amounts to about 5 to 50 mol per cent in excess of that stoichiometrically required to convert all of the carbon in the hydrocarbon gas to carbon monoxide and may be as high as 100 per cent in the case of liquid hydrocarbons where oxygent is also present in steam to the generator. The concentration of oxygen is such that under the conditions of temperature and pressure contemplated in the generator and with the aforesaid preheating of the reactants, the reaction is effected without necessity for external heating of the reaction zone. By separately preheating the reactant gases and effecting mixing of the preheated gases entirely within the reaction zone, backfiring in the feed lines and the preheaters is prevented.

The reactants are introduced into admixture with one another within the reaction zone. A stream comprising the hydrocarbon fuel and a separate stream of oxygen are separately introduced into the reaction zone and mixed therein so as to maintain the locus of combustion removed from the point of introduction of the reactants. Intimate mixing is accomplished by impingement of the streams on one another at relatively high velocity, e. g., from about 60 to about 300 feet per second.

A portion of the total oxygen charged may be premixed with the hydrocarbon gas, providing the resulting mixture is incombustible under the prevailing conditions of preheating. For instance, the oxygen or oxygen-enriched gas may be divided into major and minor streams, the major stream containing about 55 to 85 per cent of the total oxygen suppled, while the minor stream contains from 15 to 45 per cent of the total oxygen. The major stream of oxygen may be combined with the hydrocarbon, such as methane, and preheated to a temperature of about 1,000 to 1,200° F., this temperature being practicable because of the proportions of the mix. Adequate mixing is secured in the preheater due to turbulence of the two reactants. The minor stream of oxygen or oxygen-enriched gas may be heated in a separate preheater, the limit of preheat being governed by the material of which the preheater and conducting pipes are formed.

Without in any way limiting the present invention, the following theory is offered in an attempt to explain the unexpected results obtained in the process of our invention. The employment of a compact unpacked reaction zone is an important factor in that it provides unobstructed flow of radiant energy between the adjacent walls, all wall surfaces being within easy reach of the source or sources of such radiant energy as is evolved by that portion of the reactants undergoing exothermic reaction, i. e., in the primary reaction. With methane as the hydrocarbon, as much as 25 per cent thereof may undergo combustion forming carbon dioxide and water vapor which products in turn react endothermically with additional methane in the reaction zone to form carbon monoxide and hydrogen. This primary exothermic combustion, which supplies energy required for the secondary endothermic reactions, appears to be effected mainly in the small region of initial contact between entering gas and oxygen.

It has been found that as regards the most efficient utilization of the energy from the primary or exothermic reaction in the secondary or endothermic reactions, the generator in addition to being devoid of packing, should be of a shape such that the internal surface area is small relative to the internal volume as in the case of a sphere. However, because of other design requirements, a sphere is not always a practical shape, a shape such as a cylinder with a concave or convex end or ends being usually preferred.

The surface-volume ratio of such a generator can best be defined with reference to its relation to a sphere of the corresponding volume, it being readily apparent that the surface-volume ratio of the generator will approach but never quite reach the surface-volume ratio of a sphere of equal volume. This degree of approach to the surface-volume ratio of a sphere can be expressed by a constant K in terms of the ratio of the overall length to the radius of any generally cylindrical generator regardless of whether one or both ends be flat, concave or conical. The constant K can be defined as the ratio of the surface of a sphere to the internal surface of a generator, the two being of equal volume.

The value of the constant K as related to the ratio of the overall length and the radius of a pure cylindrical generator, and considering the feed and product ports as a continuous part of the surface in which they are located, can be determined as follows:

Surface of the generator $(S_g) = 2R^2\pi + 2\pi RL$
Volume of the generator $(V_g) = \pi R^2 L$ where R is the radius of the generator and L is the overall length.

The surface and volume of a sphere of equal volume can be determined as follows:

Surface of the sphere $(S_s) = 4R^2_1$
Volume of the sphere $(V_s) = \frac{4}{3}R^3_1$ where $R_1$ is the radius of the sphere but $V_g = V_s$, so $R^2 L = \frac{4}{3} R^3_1$
$R^3_1 = \frac{3}{4} R^2 L$
$R_1 = (\frac{3}{4} R^2 L)^{\frac{1}{3}}$ Since the volumes of the sphere and the generator are assumed equal, K is determined as follows, i. e.:

$$K = \frac{\text{Surface of the spere}}{\text{Surface of the generator}} = \frac{S_s}{S_g}$$

or $$K = \frac{4R^2_1}{2(R^2 + RL)} = \frac{2R^2_1}{R^2 + RL}$$

Substituting the value of $R_1$, $$K = \frac{2(\frac{3}{4}R^2 L)^{\frac{2}{3}}}{R^2 + RL}$$

The following table illustrates the value of K and for the reciprocal of K, $S_g/S_s$ (the internal surface of a generator divided by the surface of a sphere of equal volume for cylindrical generators of selected ratios of overall length to radius:

| R | L | Overall L/R | K | $S_g/S_s$ |
|---|---|---|---|---|
| 1 | 0.01 | 0.01 | 0.0759 | 13.175 |
| 1 | 0.1 | 0.1 | 0.3234 | 3.092 |
| 1 | 0.2 | 0.2 | 0.4706 | 2.125 |
| 1 | 0.5 | 0.5 | 0.6934 | 1.442 |
| 1 | 1.0 | 1.0 | 0.8254 | 1.212 |
| 1 | 2.0 | 2.0 | 0.8736 | 1.145 |
| 1 | 5.0 | 5.0 | 0.8046 | 1.243 |
| 1 | 10.0 | 10.0 | 0.6966 | 1.436 |
| 1 | 20.0 | 20.0 | 0.5793 | 1.726 |
| 1 | 50.0 | 50.0 | 0.4394 | 2.276 |
| 1 | 100.0 | 100.0 | 0.3522 | 2.839 |

The aforesaid values of K and L/R are plotted as the solid line in Figure 3 on a logarithmic scale. It will be noted therefrom that in varying the ratio of L/R:K for the cylinder with flat ends approaches and then recedes from a value of 1, the S/V ratio of the sphere never being attained.

The remaining curves in Figure 3 represent the K versus L/R ratios for cylinders of the end shapes indicated and a generator of square cross-section, the radius of an inscribed circle in the latter being taken as R. For cylinders of other than flat ends, R is taken as the radius of the cylindrical section. In the case of the conical ends, the included angle has been taken as 60°. Such curves can readily be determined in the case of each cylinder by the following formulas.

For a cylindrical generator having one hemispherical end, $$K = \frac{4(0.5R^3 + 0.75R^2 L)^{\frac{2}{3}}}{3R^2 + 2RL}$$

where L is the length of the pure cylindrical section.

For a cylindrical generator with two hemispherical ends, $$K = \frac{2(R^3 + 0.75R^2 L)^{\frac{2}{3}}}{3R^2 + 2RL}$$

where L is the length of the pure cylindrical section.

For a cylindrical generator with one 60° conical end, $$K = \frac{4[R^2(0.75L + 0.4330127R)]^{\frac{2}{3}}}{R(3R + 2L)}$$

where L is the length of the pure cylindrical section.

For a cylindrical generator with two 60° conical ends, $$K = \frac{2[R^2(0.75L + 0.8660254R)]^{\frac{2}{3}}}{R(L+2R)}$$

where L is the length of the pure cylindrical section and R is the maximum radius or the radius of the cylindrical section and the base of the conical section.

For a rectangular parallelepiped of square cross-section of a side dimension $w$, $$K = \frac{2.417988(Lw^2)^{\frac{2}{3}}}{2Lw + w^2}$$

In the case of the cylindrical generator with one hemispherical end, the L of the $L/R$ ratio is taken as the overall length of the generator, i. e., $L+R$, the corresponding curve in Figure 3 being derived from the following data:

| R | L of the Formula | Overall L / R | K | $S_g/S_s$ |
|---|---|---|---|---|
| 1 | 0.0 | 1.0 | 0.8399 | 1.191 |
| 1 | 0.01 | 1.01 | 0.8427 | 1.187 |
| 1 | 0.1 | 1.1 | 0.8643 | 1.157 |
| 1 | 0.2 | 1.2 | 0.8828 | 1.133 |
| 1 | 0.5 | 1.5 | 0.9148 | 1.093 |
| 1 | 1.0 | 2.0 | 0.9283 | 1.077 |
| 1 | 2.0 | 3.0 | 0.9071 | 1.102 |
| 1 | 5.0 | 6.0 | 0.8073 | 1.239 |
| 1 | 10.0 | 11.0 | 0.6957 | 1.437 |
| 1 | 20.0 | 21.0 | 0.5783 | 1.729 |
| 1 | 50.0 | 51.0 | 0.4389 | 2.278 |
| 1 | 100.0 | 101.0 | 0.3520 | 2.841 |

In the case of the cylindrical generator with two hemispherical ends, the L of the $L/R$ ratio is taken as the overall length of the generator, i. e., $L+2R$, the corresponding curve on Figure 3 being derived from the following data:

| R | L of the Formula | Overall L / R | K | $S_g/S_s$ |
|---|---|---|---|---|
| 1 | 0 (a sphere) | 2.0 | 1.0000 | |
| 1 | 0.01 | 2.01 | 0.9999 | 1.000 |
| 1 | 0.1 | 2.1 | 0.9994 | 1.001 |
| 1 | 0.2 | 2.2 | 0.9979 | 1.002 |
| 1 | 0.5 | 2.5 | 0.9892 | 1.011 |
| 1 | 1.0 | 3.0 | 0.9681 | 1.033 |
| 1 | 2.0 | 4.0 | 0.9210 | 1.086 |
| 1 | 5.0 | 7.0 | 0.8073 | 1.239 |
| 1 | 10.0 | 12.0 | 0.6942 | 1.441 |
| 1 | 20.0 | 22.0 | 0.5722 | 1.748 |
| 1 | 50.0 | 52.0 | 0.4385 | 2.281 |
| 1 | 100.0 | 102.0 | 0.3518 | 2.843 |

In the case of the cylindrical generator with one 60° conical end, L of the $L/R$ ratio is taken as $L+1.73205R$, the corresponding curve on Figure 3 being derived from the following data:

| R | L of the Formula | Overall L / R | K | $S_g/S_s$ |
|---|---|---|---|---|
| 1 | 0 | 1.73205 | 0.7631 | 1.310 |
| 1 | 0.01 | 1.74205 | 0.7668 | 1.304 |
| 1 | 0.1 | 1.83205 | 0.7958 | 1.257 |
| 1 | 0.2 | 1.93205 | 0.8210 | 1.218 |
| 1 | 0.5 | 2.23205 | 0.8675 | 1.153 |
| 1 | 1.0 | 2.73205 | 0.8948 | 1.118 |
| 1 | 2.0 | 3.73205 | 0.8867 | 1.128 |
| 1 | 5.0 | 6.73205 | 0.7988 | 1.252 |
| 1 | 10.0 | 11.73205 | 0.6918 | 1.446 |
| 1 | 20.0 | 21.73205 | 0.5766 | 1.734 |
| 1 | 50.0 | 51.73205 | 0.4384 | 2.281 |
| 1 | 100.0 | 101.73205 | 0.3516 | 2.844 |

For a cylindrical generator with two 60° conical ends, L of the $L/R$ ratio is taken as $L+3.46410R$, the corresponding curve on Figure 3 being derived from data such as the following:

| R | L of the Formula | Overall L / R | K | $S_g/S_s$ |
|---|---|---|---|---|
| 1 | 0 | 3.4641 | 0.9085 | 1.101 |
| 1 | 0.01 | 3.4741 | 0.9092 | 1.100 |
| 1 | 0.1 | 3.5641 | 0.9145 | 1.093 |
| 1 | 0.2 | 3.6641 | 0.9188 | 1.088 |
| 1 | 0.5 | 3.9641 | 0.9239 | 1.082 |
| 1 | 1.0 | 4.4641 | 0.9181 | 1.089 |
| 1 | 2.0 | 5.4641 | 0.8878 | 1.126 |
| 1 | 5.0 | 8.4641 | 0.7921 | 1.262 |
| 1 | 10.0 | 13.4641 | 0.6868 | 1.456 |
| 1 | 20.0 | 23.4641 | 0.5740 | 1.742 |
| 1 | 50.0 | 53.4641 | 0.4375 | 2.286 |
| 1 | 100.0 | 103.4641 | 0.3514 | 2.846 |

For a rectangular parallelepiped of square cross-section $w$ has been taken as the diameter of an inscribed circle, $w$ being also the width of any one side. In calculating the following data for the curve of Figure 3, $0.5w$ has been taken as the radius.

| w | L of the Formula | Overall L / 0.5w | K | $S_g/S_s$ |
|---|---|---|---|---|
| 2 | 0.01 | 0.01 | 0.0700 | 14.286 |
| 2 | 0.1 | 0.1 | 0.2983 | 3.352 |
| 2 | 0.2 | 0.2 | 0.4341 | 2.304 |
| 2 | 0.5 | 0.5 | 0.6397 | 1.563 |
| 2 | 1.0 | 1.0 | 0.7616 | 1.313 |
| 2 | 2.0 | 2.0 | 0.8060 | 1.241 |
| 2 | 5.0 | 5.0 | 0.7423 | 1.347 |
| 2 | 10.0 | 10.0 | 0.6427 | 1.556 |
| 2 | 20.0 | 20.0 | 0.5344 | 1.871 |
| 2 | 50.0 | 50.0 | 0.4054 | 2.467 |
| 2 | 100.0 | 100.0 | 0.3249 | 3.078 |

With the thus derived curves of Figure 3, it is apparent that the value of K can be determined for any of the reactors of different shapes, providing the ratio of $L/R$ is known. The actual dimensions of the reactor are immaterial. The reciprocal of K gives the value for the internal surface area of the reaction zone of the generator as compared with a sphere of equal volume.

For example, if it is desired to use a generator formed as a cylinder with one flat end and one hemispherical end, one of the most practical shapes, reference can be made to the curve for such a shape whereupon it will be found that the closest approach to the surface-to-volume ratio of the sphere of corresponding volume is found where K is about 0.93. The corresponding $L/R$ ratio is about 2.0. Thus if the selected reactor is to be 10 feet long overall, the radius should be 5 feet. The internal surface area of the reaction zone of the generator in this instance is about 1.075 times the surface of a sphere of equal volume.

For the purpose of this invention, a range of $L/R$ from about 0.67 to 15 is desirable, the preferred ratio being in the range of 1 to 4. The internal surface area of the reaction zone of the generator is less than about 1.5 times the surface area of a sphere of equal volume; obviously, since a sphere has minimum surface with relation to its volume, the surface area of the reaction zone can only approach the surface of a sphere of equal volume and will never be less than 1.0 times the surface area of said sphere.

In any case, it is desirable for the open reaction zone to be sufficiently compact so that the temperature is substantially uniform throughout the entire reaction zone.

Avoidance of external firing of the reaction zone and the absence of refractory packing material from the interior thereof overcomes serious apparatus, construction and operating limitations that have existed heretofore. Absence of packing not only avoids a substantial pressure drop through the reaction zone, but also materially reduces the tendency toward carbon formation and deposition since it appears that large surface area increases free carbon formation. Deposition of carbon also increases the pressure differential through the reaction zone.

A further advantage of the absence of packing and the surface-volume or length to radius ratio already described is found in the fact that the clear unobstructed space so formed, with its large volume relative to its internal surface enables a substantially complete transfer of the energy from the primary exothermic reaction to the secondary endothermic reactions by radiation. Whatever energy may be radiated from the exothermic reaction onto the surrounding walls of the reactor is immediately re-radiated back into the reaction zone, very little energy being lost, the wall surfaces being preferably of a character to insure maximum re-radiation. Moreover, all the products of the primary reaction, whether they be in the form of radicals, activated molecules, etc., are free to proceed to the secondary reaction in a highly mixed and energized state without interference by a physical body such as packing. The absence of packing insures a free path of travel for both the radiant energy from the primary reaction and the radiant energy re-radiated from the walls to the zone of secondary reaction, thereby causing the secondary reaction or reactions to proceed faster and at a higher and more uniform temperature or energy level at which a better product composition is attained.

This action is in decided contrast to the action in a packed reactor, wherein (1) the products of the exothermic reaction come into physical contact with packing almost immediately upon formation, causing them to react to form more stable molecules, deposit carbon on the packing surfaces, and to deactivate the active molecules, so losing energy that would otherwise be available to the secondary reaction, (2) the products entering into the secondary reaction are shielded to a material extent from the radiant heat of the exothermic reaction and any re-radiation from the walls, and (3) the products of the exothermic reaction tend to pocket in the interstices of the packing with consequent carbon deposition and loss of final product.

In Figure 1, the numeral 1 designates a cylindrical vessel lined with refractory material 2. A baffle formed of walls 3a and 3b is provided within the vessel to divide it into two sections, one section being the reaction zone 5 which, for example, is about 8 feet in length along its horizontal axis, while the other section 6 is used for cooling the resulting product gases. With a radius of 2½ feet, the L/R ratio is about 3.2 which is well within the preferred range. Walls 3a and 3b are designed to permit flow of reaction gases therethrough with no substantial drop in pressure while protecting the interior of the cooling section from direct radiation from the reaction section and insuring re-radiation back to the reaction zone, this being accomplished by the staggered arrangement of the openings 3c.

A cooling coil 7 is embedded in the refractory lining of the reaction section and adapted for the circulation therethrough of water, or any other fluid heat carrier, the purpose being to prevent overheating of the metal shell. The heat, so absorbed, may be used for preheat purposes and for steam or power generation for use elsewhere in the process.

The reactant gases are introduced to the reaction zone through a plurality of gas feeders 8 which are described in more detail in connection with Figure 2.

The reaction products are discharged from the generator through passages 3c into cooling section 6 where they are reduced in temperature by a water spray 9. The steam resulting from the quench water passes out opening 6a with the product gas.

While a cooling zone 6 has been shown as a section of the same vessel occupied by the reaction zone 5, it will be understood that the reaction zone and cooling zone may be disposed in separate vessels. Part or substantially all of the cooling may be accomplished by indirect heat exchange.

Figure 2:
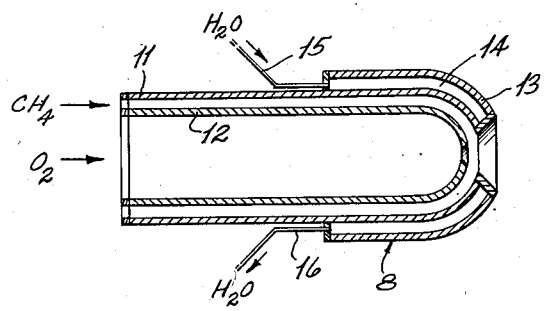
Figure 2 is a longitudinal section of a preferred form of gas feeder.

The gas feeders 8, as indicated in Figure 2, comprise essentially two concentric tubes 11 and 12 terminating in a water cooled tip 13. Thus, the tip 13 is of hollow construction having a water space 14 to which water is introduced through a tube 15 and removed through a tube 16.

One of the reactant gases flows through the annular space between the tubes 11 and 12, while the other reactant flows through the interior of the inner tube 12. Thus methane may flow through the annular space, while oxygen flows through the inner passage, or vice versa. Thus, the methane and oxygen streams impinge upon each other at the point of discharge from the tip 13 which is just inside the reaction zone. As indicated in Figure 1, the feeder tips may be substantially flush with the interior surface of the refractory lining of the vessel 1.

In operation there is a small zone of blue flame, immediately adjacent the tip while in the rets of the reaction zone there is no visible flame. It is in this small region where blue flame exists, that as much as 25 per cent of the entering methane may undergo relatively complete combustion, forming carbon dioxide and water vapor, which products subsequently react with additional methane in the reaction zone to form carbon monoxide and hydrogen.

There may be a plurality of the feeders 8. For example, there may be several uniformly disposed in the end of the vessel 1.

Examples 1 to 5

Natural gas was reacted with substantially pure oxygen in a compact, unpacked generator at various pressures to produce carbon monoxide and hydrogen suitable as feed gas for the synthesis of hydrocarbons. The composition of the natural gas was as follows:

| Component: | Mol per cent |
|---|---|
| Methane | 83.6 |
| Ethane | 10.2 |
| Propane | 4.5 |
| Butane | 0.1 |
| Carbon dioxide | 1.0 |
| Air | 0.6 |
| | 100.0 |

In Example 1, neither the natural gas nor the oxygen was preheated; in Examples 2 to 5, inclusive, the natural gas was preheated to about 750° F., and the oxygen, to about 430° F. In Example 1 the reaction was conducted in a cylindrical reaction zone with flat ends, having a length about 4.3 times its radius. In Examples 2 to 5, inclusive, the reaction zone was cylindrical with conical ends, having an overall length about 10.2 times its radius.

| Example | 1 | 2 | 3 | 4 | 5 |
|---|---|---|---|---|---|
| Pressure, p. s. i. g | 18 | 105 | 205 | 305 | 405 |
| Temperature, °F | 2,520 | 2,385 | 2,480 | 2,325 | 2,495 |
| $S_a/S_t$ | 1.21 | 1.38 | 1.38 | 1.38 | 1.38 |
| Residence Time, Sec. (basis product gas) | 4.40 | 0.86 | 1.62 | 2.60 | 2.70 |
| O/C Ratio | 1.48 | 1.22 | 1.21 | 1.12 | 1.16 |
| Product Gas, Rate, SCFH/cu. ft. of generator vol | 325 | 6,280 | 5,900 | 5,620 | 6,620 |
| Composition, Mol percent (dry basis): | | | | | |
| Carbon monoxide | 39.00 | 35.74 | 36.00 | 35.12 | 35.32 |
| Carbon dioxide | 4.73 | 2.30 | 2.46 | 2.03 | 2.49 |
| Hydrogen | 55.50 | 60.80 | 60.29 | 59.88 | 61.08 |
| Nitrogen | 0.24 | 0.58 | 0.79 | 0.74 | 0.81 |
| Methane | 0.53 | 0.58 | 0.46 | 2.23 | 0.30 |
| Carbon: Lbs. per million cu. ft. of feed gas | 0.4 | 4.0 | 2.0 | 0.6 | 0.04 |
| Wt. percent, basis feed | | .008 | .004 | .0012 | .0008 |

Examples 6 to 11

Natural gas and coke oven gas were reacted with oxygen and enriched air, respectively, to obtain a low methane-content product gas suitable as a source of hydrogen for chemical processes, e. g., ammonia synthesis, in which methane is undesirable in the product gas.

In the Examples 6 to 10, inclusive, appearing below, the natural gas feed was the same as that employed in the previous examples. In Example 11, a coke oven-type gas was employed containing approximately 29 mol per cent methane, 38 per cent hydrogen, 26 per cent carbon monoxide, the balance being hydrocarbons and inerts.

In these examples the gas was reacted with oxygen in a generator having a surface-volume ratio of less than 1.5. In Examples 6 to 8, inclusive, the feed gas was separately preheated to a temperature of about 700° F. prior to introduction to the generator, and the oxygen, at a temperature of about 400° F. was separately charged to the generator so that mixing of the oxygen with the feed gas occurred within the reaction zone.

In Examples 6 to 10, inclusive, substantially pure oxygen was used, while in Example 11, the feed gas was reacted with enriched air, that is, air containing about 49 mol per cent oxygen. In Examples 9 to 11, inclusive, neither the feed gas nor the oxygen was preheated, except in Example 9, in which the oxygen was preheated to 325° F.

In Examples 6 and 7, the reaction was carried out under a superatmospheric pressure in the neighborhood of 400 pounds per square inch gauge, while in Examples 8, 9 and 10, the reaction was carried out under pressures close to atmospheric, namely, 6, 13 and 22 pounds, respectively. The operating conditions and compositions of the product gas obtained in each example are tabulated in the following table:

| Example | 6 | 7 | 8 | 9 | 10 | 11 |
|---|---|---|---|---|---|---|
| Pressure, p. s. i. g | 422 | 388 | 6 | 13 | 22 | 19 |
| Temperature, °F | 2,356 | 2,816 | 2,560 | 3,098 | 2,380 | 2,650 |
| $S_g/S_s$ | 1.38 | 1.38 | 1.17 | 1.21 | 1.21 | 1.21 |
| Residence Time, Sec. (basis product gas) | 1.96 | 1.98 | 2.40 | 1.50 | 4.20 | 2.4 |
| O/C Ratio | 1.25 | 1.33 | 1.51 | 1.60 | 1.54 | 1.81 |
| Product Gas Rate, SCFH/cu. ft. of generator vol | 9,870 | 7,760 | 362 | 655 | 387 | 508 |
| Composition,Mol percent (dry basis): | | | | | | |
| Carbon monoxide | 36.82 | 36.23 | 39.48 | 38.59 | 38.96 | 31.05 |
| Carbon dioxide | 2.63 | 2.85 | 3.51 | 4.58 | 4.77 | 6.00 |
| Hydrogen | 59.76 | 59.77 | 55.32 | 56.10 | 55.81 | 36.50 |
| Nitrogen | 0.50 | 1.06 | 1.39 | 0.70 | 0.27 | 26.24 |
| Methane | 0.29 | 0.09 | 0.30 | 0.03 | 0.19 | 0.21 |

As indicated by Examples 6, 8 and 10, it is possible to effect the reaction at temperatures of around 2300 to 2600° F. and obtain a product gas consisting essentially of carbon monoxide and hydrogen and containing not more than about 0.3 mol per cent of methane. At temperatures of about 2800 to 3000° F., the methane content of the product gas is even less and almost negligible. It is contemplated that the product gas may be even substantially free from methane. The product gas contains not more than 6 and usually substantially less than 5 mol per cent of carbon dioxide. In every instance the product gas was substantially free from solid carbon, that is, it contained not more than 10 pounds of carbon per million standard cubic feet of product gas.

The O/C ratios in the foregoing examples refer to the total oxygen charged to the generator, including that present in the fuel gas either as free or as combined oxygen and these ratios may be substantially higher than would be experienced in the usual commercial scale operation since the foregoing data were obtained in small pilot plant apparatus wherein the heat losses are relatively high as compared to those encountered in commercial scale operations.

*Examples 12 to 15*

Numerous attempts were made to operate the same reactor as was used in Examples 2 to 5, inclusive, but with a solid packing material as catalyst. Zircon chips were used as packing material. The feed gas and oxygen were the same as in previous examples. In Examples 12 and 14, steam was included in the feed.

| Example | 12 | 13 | 14 | 15 |
|---|---|---|---|---|
| Temperature, °F | 2,280 | 2,060 | 2,060 | (¹) |
| Pressure, p. s. i. g | 150 | 150 | 75 | 50 |
| O/C Ratio | 1.63 | 1.16 | 1.5 | 1.18 |
| Product Gas Composition, Mol percent (dry basis): | | | | |
| Carbon monoxide | 30.9 | 34.9 | 33.5 | 34.1 |
| Carbon dioxide | 4.9 | 2.2 | 4.6 | 3.0 |
| Hydrogen | 58.2 | 59.6 | 57.2 | 56.8 |
| Nitrogen | 3.4 | 0.4 | 3.0 | 1.4 |
| Methane | 2.6 | 2.9 | 1.7 | 4.7 |

¹ Not measured.

In every instance carbon formation was excessive. The carbon which formed bridged over the packing causing hot spots in the generator wall or plugged the generator to such an extent as to force shut-downs.

*Examples 16 and 17*

Similar tests with natural gas and oxygen illustrate the effect of extended internal surface or high surface-volume ratios on the formation of carbon. Comparison is made with Example 2.

| Example | 2 | 16 | 17 |
|---|---|---|---|
| Pressure, lb./sq. in. gauge | 105 | 119 | 108 |
| Temperature, °F | 2,385 | 2,740 | 2,400 |
| $S_g/S_s$ | 1.38 | 1.94 | 2.09 |
| Carbon Conversion, Mol Percent | 98.6 | 98.5 | 95.3 |
| Carbon formation lbs./million cu. ft. feed gas | 4 | 308 | 178 |
| Methane in product gas, Mol Percent | 0.58 | 0.6 | 1.6 |

While mention has been made of quenching the product gas with water, other methods of cooling may be used. It may often be desirable to use a combination of quenching the product gas, with water or steam, for example, to reduce its temperature immediately on leaving the gas generation zone and thereafter further cooling the product gas by indirect heat exchange. Indirect heat exchange is suitably used for the generation of steam for the process or plant utilities. It may thus be desirable to reduce the temperature of the product gas by quenching to a temperature within the range of, for example, from about 1600 to about 2400° F., depending upon the temperature at which the generator is operated. Generally it is desirable to effect the heat exchange with the product gas at an elevated temperature on the order of 1800 to 2000° F.

Mention has been made of charging methane or a gas consisting essentially of methane to the generator. It is contemplated, however, that the hydrocarbon charge to the generator may comprise higher molecular weight hydrocarbons either normally gaseous or normally liquid. The hydrocarbon charge may consist essentially of normally liquid hydrocarbons or it may comprise a combination of gaseous and liquid hydrocarbons. In the case of a liquid hydrocarbon, as with gas, the oxygen feed to the generator is adjusted to maintain the quantity of free carbon in the product gas below about 0.1 weight per cent of the carbon in the feed. Steam is supplied to the generator with the oil to supply a part of the oxygen, produce hydrogen, and control the temperature.

Liquid hydrocarbons when charged to the reactor undergo some decomposition into light hydrocarbons including methane. Furthermore, the gases in the reactor tend to produce some methane in accordance with the reaction:

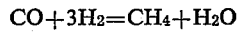

$$CO + 3H_2 = CH_4 + H_2O$$

Therefore, when charging liquid hydrocarbons, methane also appears in the product gas.

As previously mentioned, it is contemplated employing no preheating, preheating of only the hydrocarbon, or separate preheating of the hydrocarbon and oxygen streams. These streams may be preheated to temperatures as high as conveniently possible having regard to the inherent limitations in existing materials or construction. The preheating of an oxygen stream to relatively high temperatures requires employment of preheating apparatus constructed of material resistant to oxygen at such temperatures. It is desirable to preheat the hydrocarbon stream to as high as 800 to 1200° F. The oxygen may be preheated to a temperature as high as about 600° F. Preheating the reactants permits the attainment of effective reaction temperatuers with lower oxygen requirements than when preheat is not employed.

If necessary, the hydrocarbon feed or the product gas may be treated to remove sulfur compounds.

Obviously, many modifications and variations of the invention as above set forth may be made without departing from the spirit and scope thereof and, therefore, only such limitations should be imposed as are indicated in the appended claims.

We claim:

1. A continuous process for generating a carbon monoxide-hydrogen synthesis gas, which comprises separately charging a stream of oxygen-containing gas and a stream of hydrocarbon at high velocities directly into a reaction zone free from packing and catalyst, effecting mixing of said streams by impingement upon one another within said reaction zone, said hydrocarbon stream being substantially devoid of free oxygen prior to reaching the zone of impingement mixing, regulating the proportions of said streams so that the quantity of oxygen supplied to the reaction zone is in excess of the amount stoichiometrically required to convert all the carbon in said hydrocarbon to carbon monoxide and less than the amount stoichiometrically required to convert all of the carbon in said hydrocarbon to carbon dioxide, autogenously maintaining the reaction zone at a temperature in the range of 2000° F. and higher, reacting the mixture of hydrocarbon and oxygen-containing gas in the reaction zone during unidirectional and undeflected flow through the reaction zone, consuming substantially all of the free oxygen during flow through said reaction zone thereby minimizing the formation of free carbon, and withdrawing from the reaction zone an effluent stream of carbon monoxide-hydrogen synthesis gas substantially devoid of free oxygen and containing not more than about 5 mol per cent of hydrocarbon.

2. The method according to claim 1 in which the hydrocarbon is charged to the reaction zone at a space velocity of at least 1000 cubic feet per hour per cubic foot of reaction space.

3. The method according to claim 1 in which the hydrocarbon stream and the oxygen-containing stream are passed at elevated temperature into the zone of impingement mixing.

4. The method according to claim 1 in which the hydrocarbon stream is heated to a temperature in the range 700° F. and higher prior to passing to the zone of impingment mixing.

5. The method according to claim 1 in which one of said feed streams is charged to the reaction zone annularly about the other feed stream.

6. A continuous process for generating gas consisting essentially of carbon monoxide and hydrogen which comprises charging a stream of oxygen-containing gas selected from the group consisting of high purity oxygen and oxygen-enriched air at a high velocity of the order of 60 feet per second and higher directly into a reaction zone free from packing and catalyst, separately charging a stream of gasiform hydrocarbon at a high velocity of the order of 60 feet per second and higher directly into said reaction zone, effecting mixing of said streams by impingement upon one another within the said reaction zone, regulating the proportions of said streams so that the quantity of oxygen supplied to the reaction zone is in excess of the amount stoichiometrically required to convert all the carbon in said hydrocarbon to carbon monoxide and less than the amount stoichiometrically required to convert all of the carbon in said hydrocarbon to carbon dioxide, autogenously maintaining the reaction zone at a temperature in the range of 2000° F. and higher, reacting said hydrocarbon and oxygen in the reaction zone, consuming substantialy all of the free oxygen during flow through said reaction zone thereby minimizing the formation of free carbon, and withdrawing from the reaction zone an effluent stream consisting essentially of carbon monoxide and hydrogen substantially devoid of free oxygen and containing not more than about 5 mol per cent hydrocarbon.

7. The method according to claim 6 in which the hydrocarbon stream charged to the zone of impingement mixing is substantially devoid of free oxygen.

8. The method according to claim 6 in which the gasiform hydrocarbon is charged to the reaction zone at a space velocity of at least 1000 cubic feet per hour per cubic foot of reaction space.

9. The method according to claim 6 in which the hydrocarbon stream and the oxygen-containing stream are passed at elevated temperature into the zone of impingement mixing.

10. The method according to claim 6 in which the hydrocarbon stream is charged to the reaction zone annularly about said oxygen-containing stream.

11. The method according to claim 6 in which the oxygen stream is charged to the reaction zone annularly about said hydrocarbon stream.

12. The method according to claim 6 in which the mixture of hydrocarbon and oxygen is reacted during substantially unidirectional and undeflected flow through the reaction zone.

References Cited in the file of this patent

UNITED STATES PATENTS

| Number | Name | Date |
|---|---|---|
| 1,966,610 | Chilowsky | July 17, 1934 |
| 2,051,363 | Beekley | Aug. 18, 1936 |
| 2,483,132 | Gaucher | Sept. 27, 1949 |
| 2,582,938 | Eastman et al. | Jan. 15, 1952 |